Figure 1:
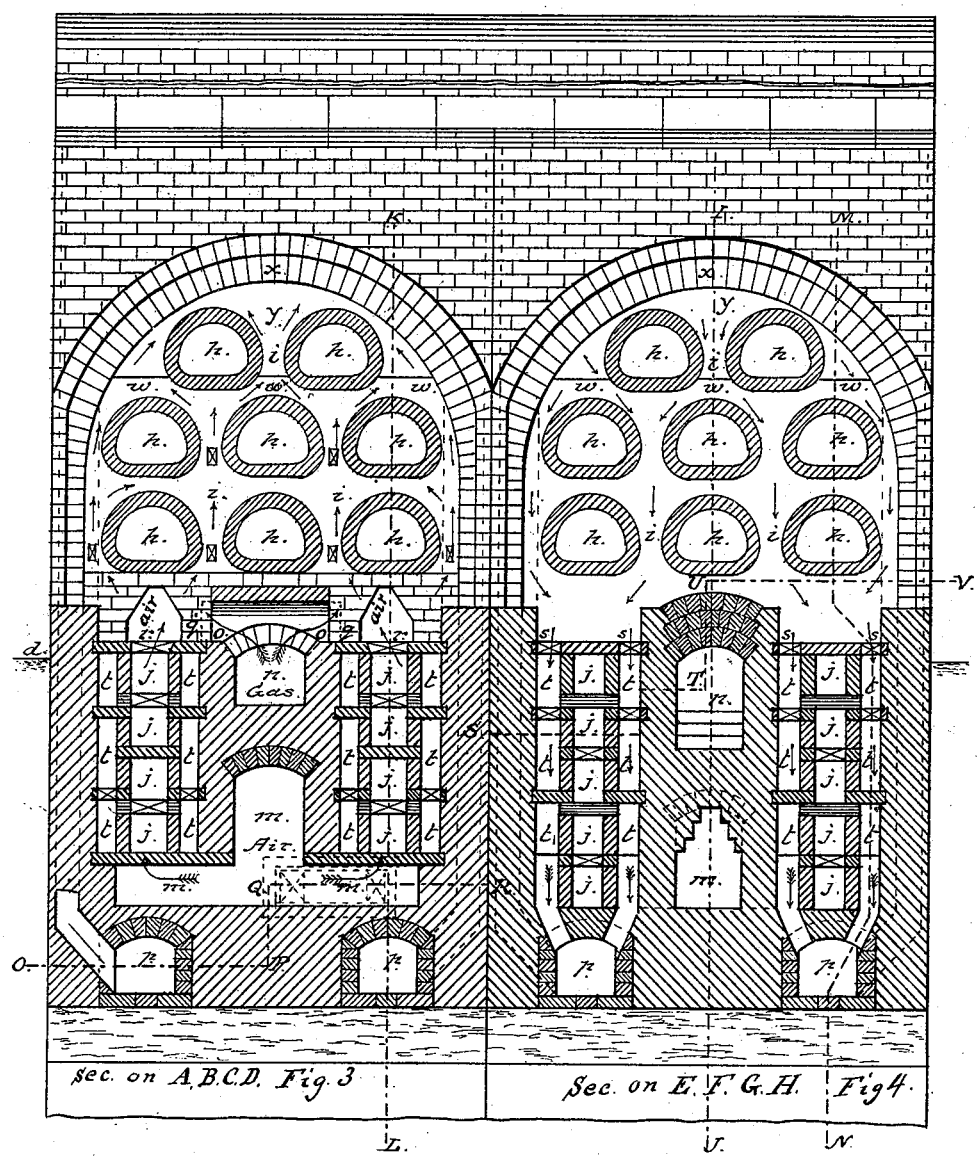

(No Model.) 6 Sheets—Sheet 1.

W. FOULIS.
RETORT FURNACE.

No. 333,122. Patented Dec. 29, 1885.

Attest:
H. W. Howard
Fred. Heller.

Inventor:
William Foulis
By C. S. Whitman
Atty.

(No Model.)   6 Sheets—Sheet 3.

W. FOULIS.
RETORT FURNACE.

No. 333,122.  Patented Dec. 29, 1885.

Attest;
F. W. Howard
Fredk. Heller

Inventor;
William Foulis
By C. S. Whitman
Atty.

(No Model.) 6 Sheets—Sheet 4.
W. FOULIS.
RETORT FURNACE.
No. 333,122. Patented Dec. 29, 1885.
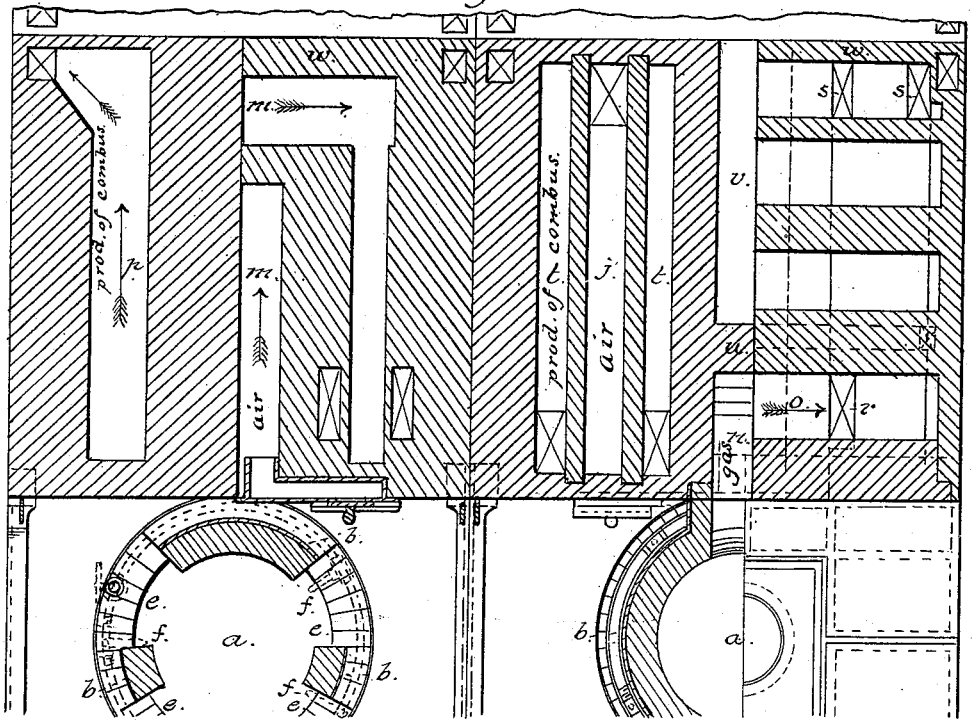
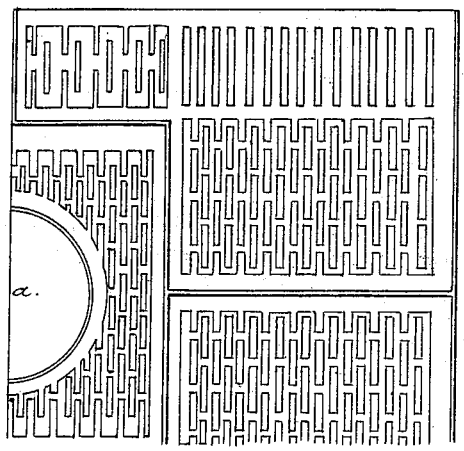

(No Model.) 6 Sheets—Sheet 5.
W. FOULIS.
RETORT FURNACE.
No. 333,122. Patented Dec. 29, 1885.
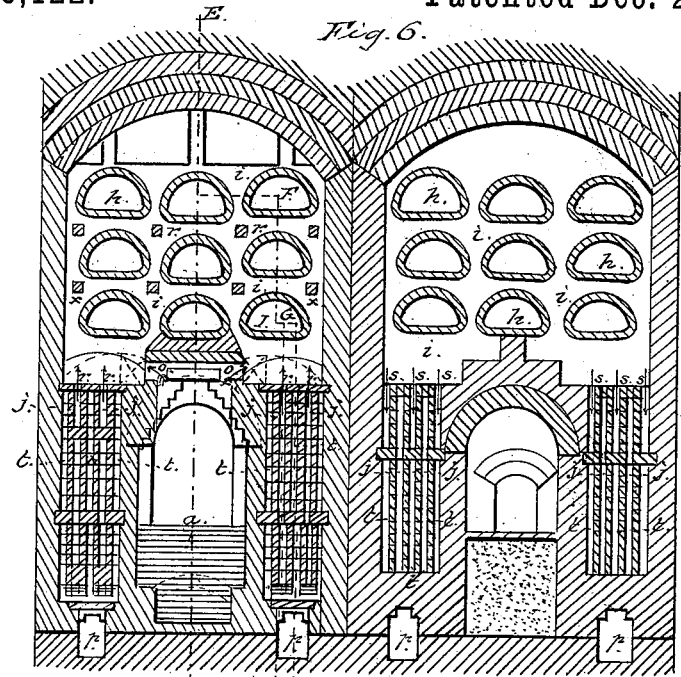
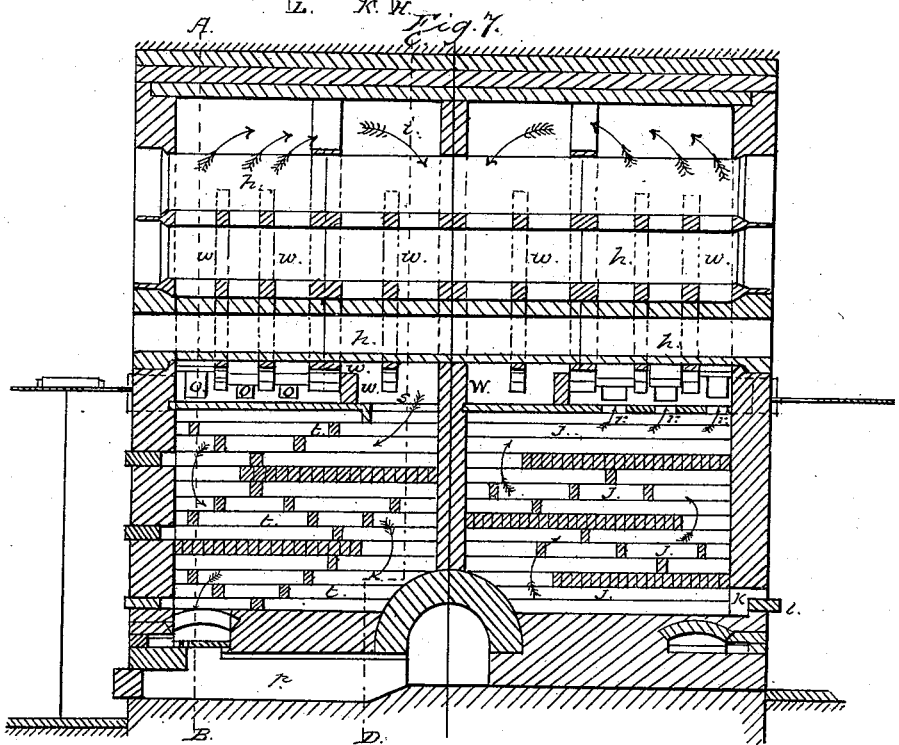
Attest:
H. W. Howard
Fred. Heller
Inventor:
William Foulis
By C. S. Whitman
Atty.

(No Model.)  6 Sheets—Sheet 6.

W. FOULIS.
RETORT FURNACE.

No. 333,122. Patented Dec. 29, 1885.

Attest;
F. W. Howard
C. Fred. Heller.

Inventor;
William Foulis
By C. S. Whitman.
Atty.

UNITED STATES PATENT OFFICE.

WILLIAM FOULIS, OF GLASGOW, COUNTY OF LANARK, SCOTLAND.

RETORT-FURNACE.

SPECIFICATION forming part of Letters Patent No. 333,122, dated December 29, 1885.

Application filed August 12, 1884. Serial No. 140,372. (No model.)

*To all whom it may concern:*

Be it known that I, WILLIAM FOULIS, of Glasgow, in the county of Lanark, North Britain, have invented Improvements in the Construction of Retort-Furnaces Applicable to the Distillation of Coal and other Purposes, of which the following is a specification of the invention.

This invention relates to the firing or heating of retort-furnaces; and it consists, principally, in the arrangement of the ports or openings for the admission of air and gas into the combustion-chamber, together with the division-walls leading upward from the ports among or around the retorts to support them, whereby the air and gas meet each other in large volumes or streams at the lower part of the setting, as distinguished from the jet-like meeting of the air and gas—that is to say, issuing from small apertures which have previously been used in regenerative gas-ovens. The result of the improved arrangement is that the flame is caused to be equally distributed throughout the oven, and therefore to heat all the retorts with uniformity; and the invention also consists in combining the improved ports and divisions with the improved regenerators hereinafter described.

In carrying this invention into practice the gaseous fuel from the producer enters the retort-oven by large openings on each side of the gas flue or chamber, and the heated air for combustion of the gaseous fuel enters into the oven through other suitable openings provided near thereto leading from the regenerators. The gas and air entering into combustion, the flame rises among the retorts more or less, as required, through each vertical channel formed by the supporting-walls of the retorts, heating them uniformly, and then taking a horizontal direction near the top of the uppermost retorts the flame descends through the channels provided to outlets in another part of the heating-chamber, also at the top of the regenerators. There are two regenerators provided for each oven, one on each side of the gas flue or chamber, and they consist of channels separated by division-walls built parallel to the retorts, through some of which the outflowing waste currents pass on their way to the chimney, while the air to support combustion flows in the adjoining channels. These channels are provided with horizontal walls extending a part of their length, thus forming zigzag passages in order to increase the length of the runs for both the inflowing air and outflowing waste gases, and thus insure the transfer of heat from the latter to the former current. This effect may be promoted by the addition in the channels of baffler-bricks. The air necessary for combustion of the gas may be first admitted into a large central chamber at the foot of the structure, from whence it divides into two currents, which pass right and left into the passages of the two regenerators, and valves or dampers are provided for regulating the amount of air admitted.

Corresponding parts in all the figures are denoted by the same letters.

Figure 2:
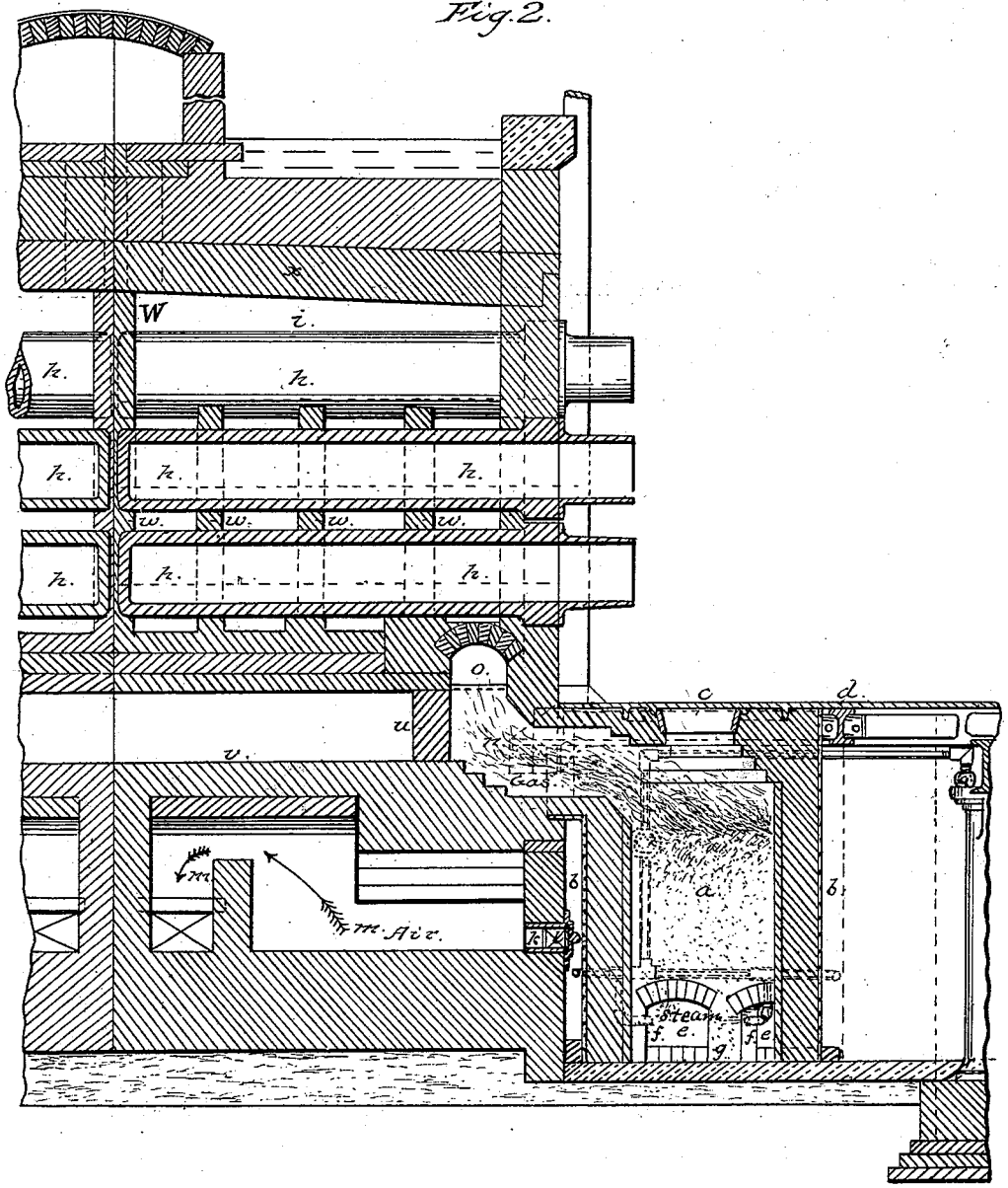
Figure 3:
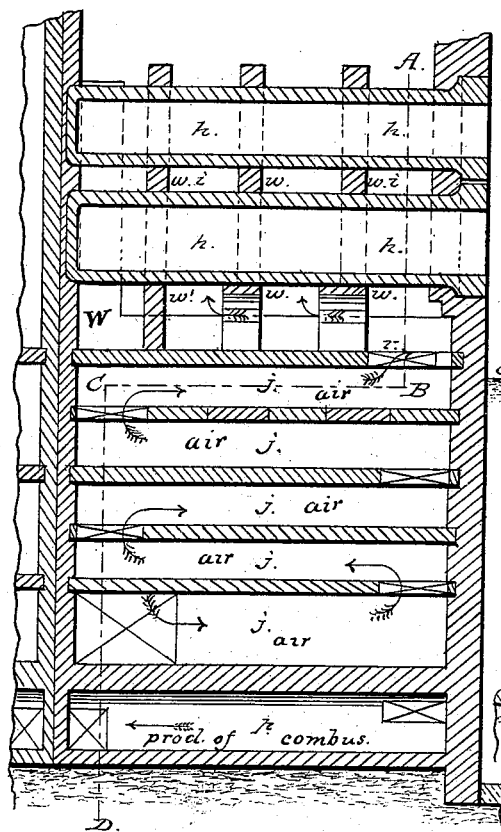
Figure 4:
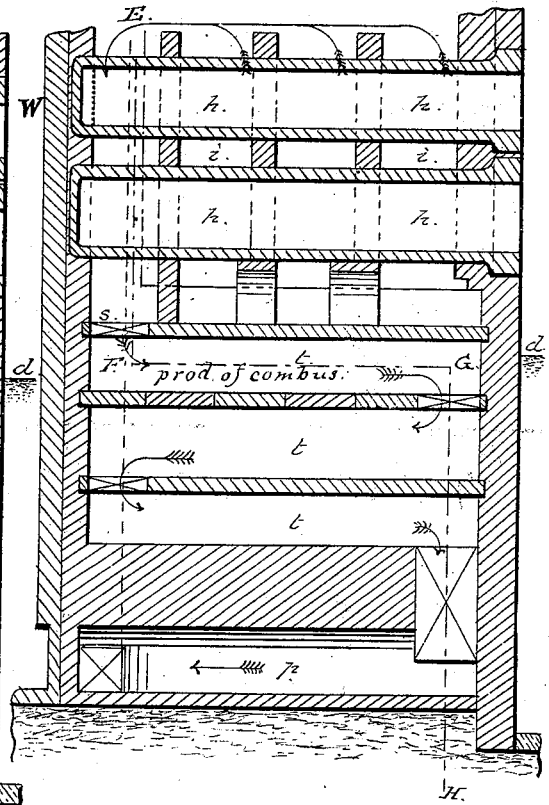
Figure 8:
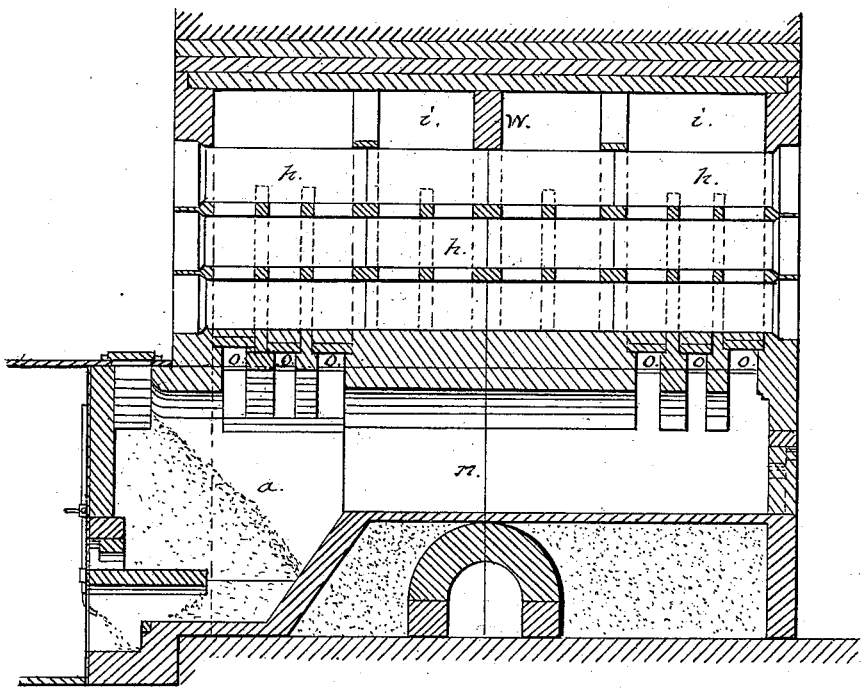

Figure 1 is a section through a bench of retorts, constructed according to this invention, the left-hand section of the oven therein represented being taken on the line A B C D, Fig. 3, and the right-hand section being taken on the line E F G H, Fig. 4. Fig. 2 is a part transverse section through the same, taken on the line I J, Fig. 1. Figs. 3 and 4 are part transverse sections of the same, taken, respectively, on the lines K L and M N, Fig. 1. Fig. 5 is a horizontal section through the same, taken on the line O P Q R S T U V, Fig. 1. Figs. 6, 7, and 8 illustrate a modification in which another form of gas-producer is used.

In carrying out these improvements immediately in front of a set of retorts there is provided the gas-producer *a*, which is constructed of brick-work of cylindrical form, and surrounded by the sheet-iron casing *b*. At its upper part the producer *a* is reduced in diameter, and it is further provided with the lid or cover *c*, preferably of cast-iron, fitted so that when closed the said lid or cover is on a level with the floor *d* of the retort-house.

At the lower part of the walls of the producer *a* there are formed several openings, *e*, by means of which any clinker that may form and the ashes of the spent fuel may be readily withdrawn. These openings *e* also allow of the admission of air to maintain the combustion in the lower portion of the mass of fuel contained in the producer. At each of these openings $e$, when certain kinds of fuel are employed, there is or may be provided the tube $f$, preferably of malleable iron, for delivering a jet of steam into the mass of fuel for the purpose of promoting combustion and breaking up any clinkers that would otherwise be likely to form. The fuel contained in the producer $a$ rests upon the floor $g$ of such producer, the said floor being preferably formed of fire-brick.

The most convenient position for the producer $a$ relatively with the set of retorts for which such producer is used for providing gaseous fuel has been found to be immediately in front thereof, and one of such producers may be used for supplying either one or two sets of retorts. In some cases, however, I may employ a producer of another form, and it may be contained within the furnace, as shown by Figs. 6, 7, and 8. The circular gas-producer described above is of the form which I have found to be most advantageous when converting the hard slaty coke made from Scotch cannel coal.

With reference more particularly to Fig. 1 of the accompanying drawings, it is seen that these improvements are represented as applied to ovens occupied by eight retorts, $h$, placed in the ovens $i$. Underneath the level of the retort-ovens $i$ there are provided in each oven two regenerators or regenerator-chambers. The form of regenerator represented on the accompanying drawings consists of a series of flues, $j$ and $t$, running parallel to the length of the retorts, and so arranged that the current of air passes therethrough in a zigzag direction upward through the central flue, $j$, while the escaping gases or products of combustion pass also in a zigzag but in opposite or downward direction through the two side flues, $t$, as indicated by the arrows at Figs. 3 and 4. The air necessary for the combustion within the oven $i$ is first admitted through the port $k$, which is provided with a damper or valve, $l$, of suitable construction, into the chamber $m$, and then it is divided into two currents, which pass right and left into and through the zigzag courses of the flues $j$, before mentioned. As the flues $j$ are at a bright heat for a considerable distance before the current of air passing therethrough leaves them, the temperature of the said air is raised to nearly the same degree. The gas formed in the producer $a$ on leaving it passes through the flue $n$, and enters the oven $i$ through the large opening $o$ on each side and underneath the side retorts, as represented by the arrows $q$, Fig. 1, where it meets the highly-heated air coming from the flues $j$ of the regenerator-chambers. The effect of the gas entering the oven $i$ through the large openings $o$, before described, and meeting and mixing with the highly-heated air, also entering the said oven $i$ through the large openings $r$, is such as to avoid localization of intense heat, as all the retorts $h$ within the oven $i$ become equally enveloped in an intensely-heating flame, which rises to the roof of the oven through several of the channels formed by the retort-supporting walls $w$, and, taking a horizontal course at the top of it, descends to the outlets $s$ through the channel situated between the central supporting-wall, $W$, and that supporting-wall $w'$ which is carried down to the bottom of oven or top of regenerators, in order to divide the combustion-chamber into two compartments, in one of which the flame flows upward and in the other flows downward. The waste gases which are used for raising the temperature of the regenerator-chambers, on reaching the outlets $s$, pass into the flues $t$ and on to the flues $p$, by which they are conducted to the chimney-stack.

The supporting-walls $w$ are provided with small openings $x$, (shown in Fig. 1,) as usual in retort-furnaces, to enable the interior of the combustion-chamber to be inspected and the retorts to be patched, if necessary; but these openings are not to be made in the central supporting-wall, $W$, of a pair of furnaces placed end to end, to which the drawings, Figs. 1 to 5, have reference.

I claim—

1. A retort-furnace having gas and air ports arranged on each side of the gas flue or chamber, in combination with division-walls leading upward from the ports among the retorts and supporting them, as and for the purposes described.

2. A gas-retort furnace having the large openings $o$ for the gas, the gas-flue $n$, the large air-openings $r$ on each side thereof, and air-flues $j$, as and for the purpose described.

3. A gas-retort furnace having openings $o$ and flue $n$ for the gas, the large openings $r$, and the flues $j$, the channels formed by the retort-supporting wall $w$ and the retort-supporting wall $w'$, which is carried down to the top of the regenerative furnace, as and for the purpose described.

In testimony whereof I have signed my name to this specification in the presence of two subscribing witnesses.

WILLIAM FOULIS.

Witnesses:
 ST. JOHN VINCENT DAY,
 ROBERT ADAM GREENE,
 *Both of* 115 *St. Vincent Street, Glasgow.*